United States Patent [19]

Schallier

[11] Patent Number: 5,450,569
[45] Date of Patent: Sep. 12, 1995

[54] METHOD FOR THE VISUALIZATION OF LOGGED INFORMATION IN A COMMUNICATION SYSTEM

[75] Inventor: Walter Schallier, Gent, Belgium

[73] Assignee: Siemens Aktiengesellschaft, Munich, Germany

[21] Appl. No.: 915,633

[22] Filed: Jul. 21, 1992

[30] Foreign Application Priority Data

Jul. 31, 1991 [EP] European Pat. Off. .......... 91112908

[51] Int. Cl.$^6$ ............................................ G06F 11/30
[52] U.S. Cl. .................................... 395/650; 395/500;
395/161; 364/232.3; 364/237.2; 364/474.03;
364/455; 364/574; 340/825.03; 340/825.15;
370/13
[58] Field of Search ................. 371/20.1, 19, 11.3,
371/16.5; 395/575, 500; 364/221, 221.4, 221.5,
221.7, 232.3, 237.2, 455, 474.03, 234.3, 267, 259,
285; 375/121

[56] References Cited

U.S. PATENT DOCUMENTS

| | | | |
|---|---|---|---|
| 3,707,725 | 12/1972 | Dellheim | 371/19 |
| 4,253,157 | 2/1981 | Kirschner et al. | 364/900 |
| 4,315,315 | 2/1982 | Kossiakoff | 364/300 |
| 4,675,832 | 6/1987 | Robinson et al. | 364/521 |
| 4,872,197 | 10/1989 | Pemmaraju | 340/825.02 |
| 4,972,183 | 11/1990 | Kuhlman et al. | 340/825.22 |
| 5,036,318 | 7/1991 | Bachhuber et al. | 340/825.16 |
| 5,043,884 | 8/1991 | Kuhlmann et al. | 364/222.3 |
| 5,051,962 | 9/1991 | Eaton | 367/33 |
| 5,151,687 | 9/1992 | Younger | 340/706 |
| 5,321,828 | 6/1994 | Phillips et al. | 395/500 |

FOREIGN PATENT DOCUMENTS

0254115 1/1988 European Pat. Off. .
3921628 1/1991 Germany .
63-100559 10/1989 Japan .

OTHER PUBLICATIONS

"A Hardware-Independent Testing Environment for SESS TM Switching System Software", by D. C. Newkirk et al, IEEE Global Telecommunications Conference, Nov. 26–29, 1984, pp. 1274–1276.

"Uberprufung und Test der Softward fur das Digitalvermittlungssystem EWSD", Ernst J. Fiecht, Telcom Report, vol. 8, (1985) May/Jun. No. 3, pp. 184–188.

Primary Examiner—Robert W. Beausoliel, Jr.
Assistant Examiner—Dieu-Minh Le
Attorney, Agent, or Firm—Hill, Steadman & Simpson

[57] ABSTRACT

Method for the visualization of logged information in a communication system. With the assistance of an administration and maintenance program module (trace program module), the logged information is respectively formed by code words (KW) logging a program step during the execution of switching-oriented programs utilized in a communication system. With the assistance of the method, those code words (KWS) that were logged during the execution of prescribed originating and prescribed destination programs are selected. Prescribed terms of the selected code words (KWS) are converted into mnemonic information (pi, zn, un, zsn, mn) and displayed at a display means. Further, the directional information (rn) indicating the internal message flow and the message flow between the programs is formed and graphically displayed at the display means. The interpretation of the logged information is thereby considerably simplified.

12 Claims, 3 Drawing Sheets

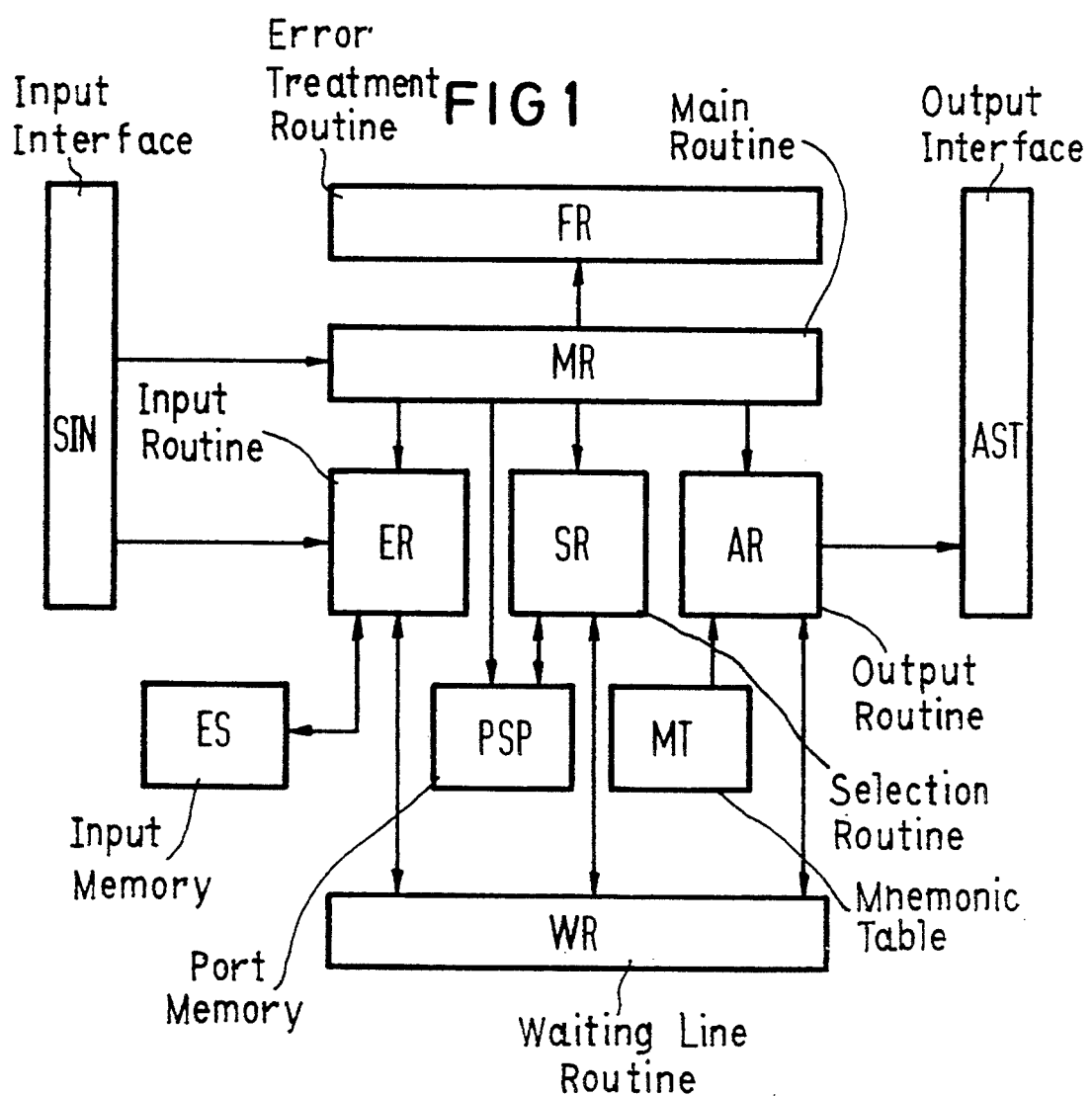

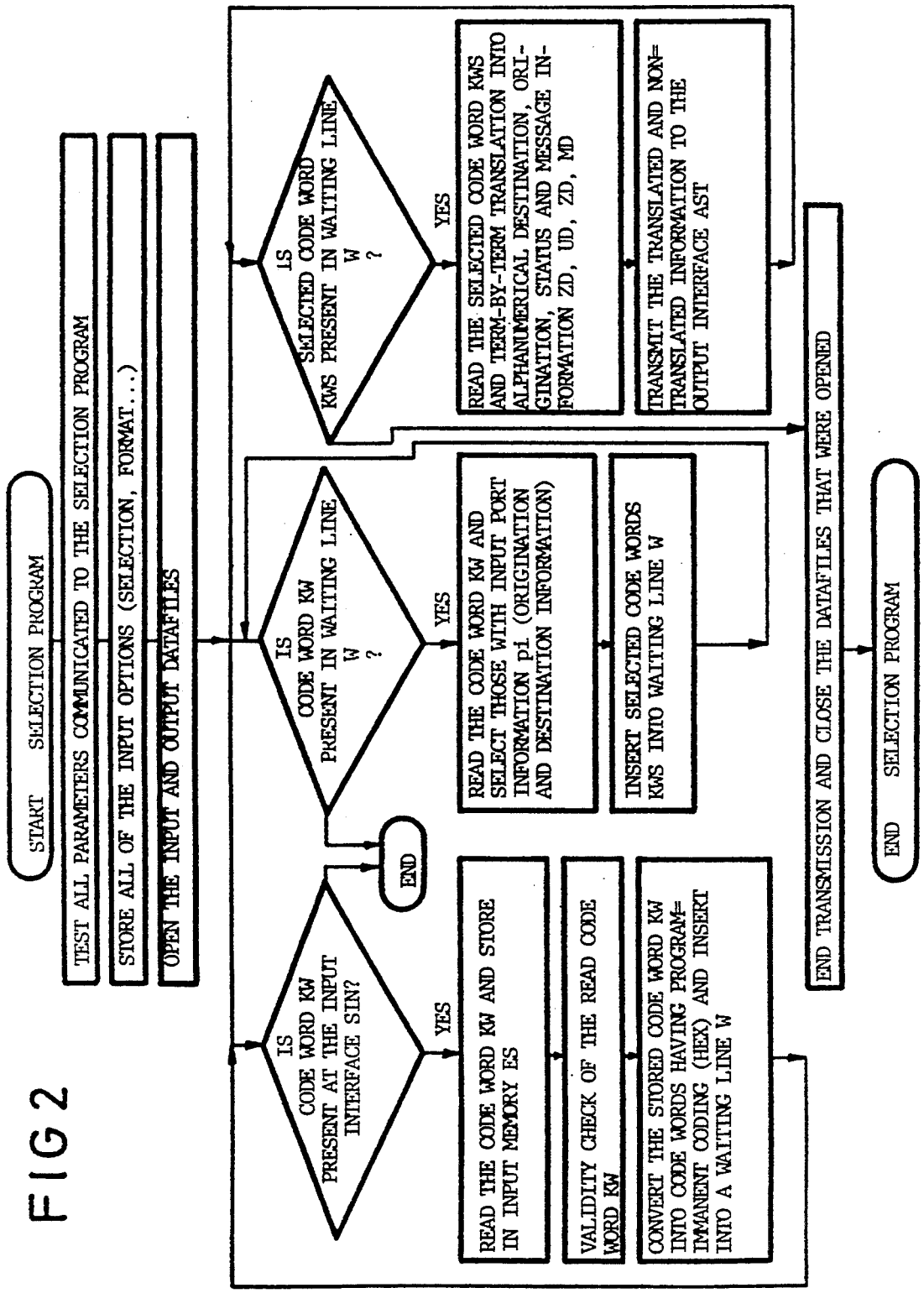

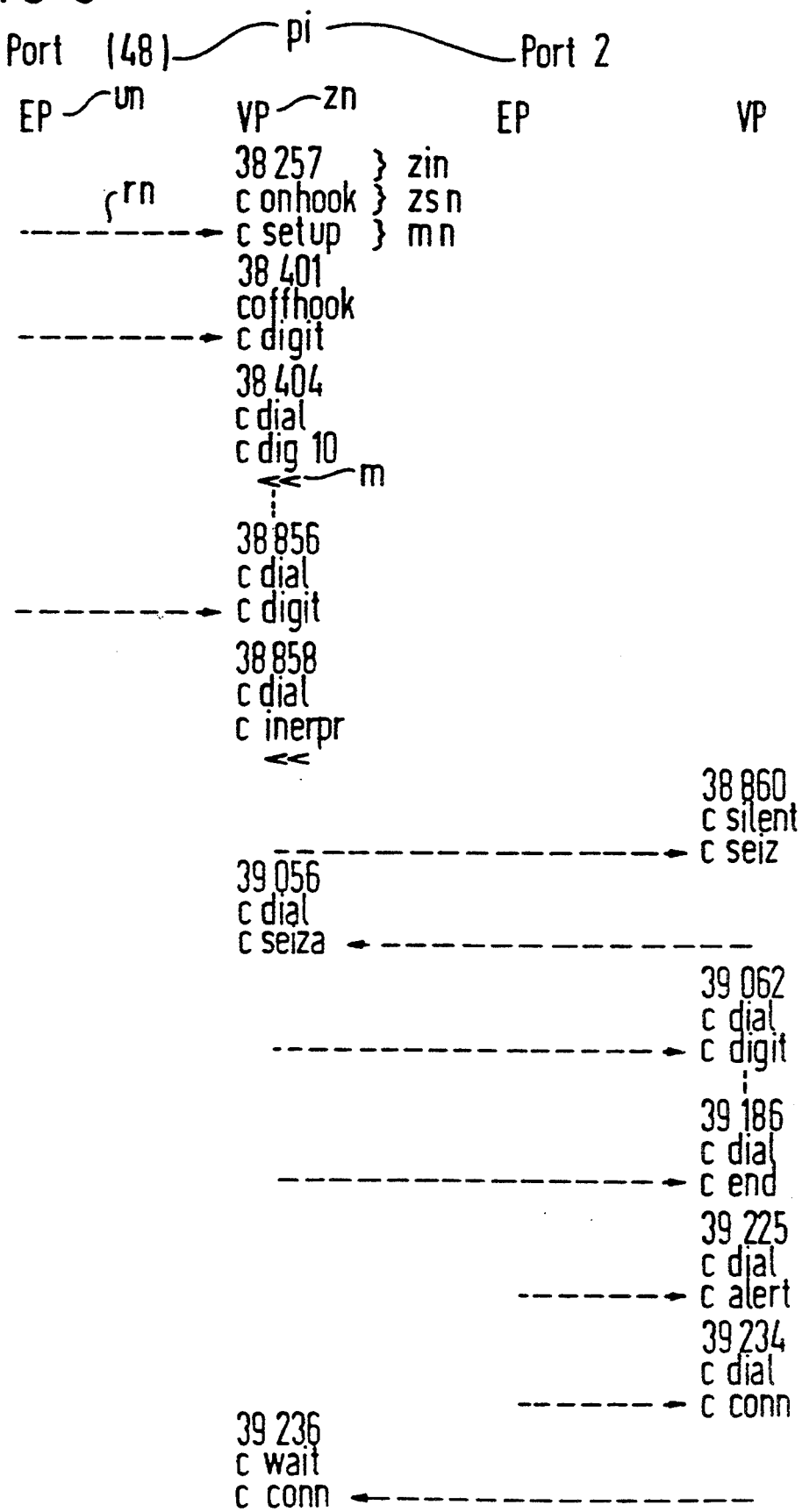

METHOD FOR THE VISUALIZATION OF LOGGED INFORMATION IN A COMMUNICATION SYSTEM

BACKGROUND OF THE INVENTION

Programs, referred to as "trace" programs, are known for error detection and error localizing in other programs or sub-programs. By means of these trace programs, the execution of a program to be checked is duplicated step-by-step and information resulting therefrom is logged. In addition to this information, respective time information, origin and destination information and information indicating the respective switching-oriented condition are logged. The origin information respectively represents a program by means of which information is formed or to which information is communicated. The destination information identifies the destination program to which the information is communicated.

Upon utilization of such trace programs in communication systems such as, for example, in a switching system, it is predominantly switching-oriented information such as, for example, call set up and cleardown messages, that is logged or registered. The trace programs are predominantly realized as administration and maintenance programs in a communication system, whereby these programs that are not constantly used are transferred or "loaded" into the main memory of the central controller of the communication system as needed from a peripheral storage means that is usually a read-only memory, for example, a hard disk. During and after the one-time or repeated execution of the program or programs to be checked, the logged information is communicated to a peripheral storage means and deposited thereat, for example on a "floppy disk". The deposited, logged information can be subsequently displayed or visualized either at a display means of an operating means allocated to the communication system or at a display means, for example a video screen of a personal computer.

The switching-oriented information to be logged for every program step is usually present in coded, for example binary coded form, and registered as code words and subsequently communicated to a display means and displayed thereat. With respect to the decoding, the allocation to the originating and destination program and the information flow of the switching-oriented information, the displayed information requires a time-consuming interpretation by an operator in order to achieve an evaluation of the logged information.

SUMMARY OF THE INVENTION

It is an object of the present invention to display logged information derived from an analysis of program execution. Proceeding on the basis of a trace program module utilized in a communication system, the method for visualizing switching-oriented, logged information about the execution of switching-oriented programs utilized in a communication system, whereby the logged information is formed by means of an administration and maintenance trace program module, being formed by code words that respectively log a program step, comprises the following steps. Those code words that are formed on the basis of program steps sequencing in prescribed originating programs and prescribed destination programs are selected from the logged code words. Prescribed, coded terms of a selected code word are converted into a mnemonic destination or originating information that represents the respective originating or destination program, into a mnemonic status information representing the switching-oriented status of the originating and/or destination program, or into a mnemonic message information representing a switching-oriented message. A directional information indicating the message flow is formed by evaluating the originating and destination information in a selected code word. The destination and originating information, as well as the message, status and directional information and non-converted term information are communicated to a display means, whereby the directional information is controlled at the display means such that an internal message information or the communication direction of the message information communicated from the originating information to the destination information is graphically displayed.

An important aspect of the method of the present invention is that, for visualization, those code words that have a prescribed originating and destination information are selected from the registered code words. The destination and origination information define the program modules whose logged program steps are to be selected from the registered, logged information or code words. In addition, those code words may be selected whose logged originating or destination information were logged together with the prescribed destination or originating information in the selected code words. What is thereby achieved is that additional code words with non-prescribed originating or destination information are selected, whereby their originating or destination information, however, was defined together with a prescribed destination or originating information in a selected code word. As a result of this measure, the logged information of programs or sub-programs can additionally be selected whose allocated originating or destination address is not prescribed but communicate with programs whose allocated originating or destination information is prescribed.

The originating or destination information, for example, can be input from an input keyboard of a personal computer or of an operating terminal allocated to a communication system and can be stored thereat in a memory means.

A further important aspect of the method of the present invention is that specific, i.e. prescribed terms of the selected code words are respectively converted into a mnemonic destination or originating information representing the respective originating or destination program, into a mnemonic status information representing the switching-oriented status of the originating and/or destination program, as well as into a mnemonic message information representing a switching-oriented message and a directional information indicating the message flow is formed by evaluating the originating and destination information in a code word. The destination and originating information as well as the message, status and directional information and non-converted term information such as, for example, time information, are communicated to a display means for the purpose of a visualization. The directional information is controlled at the display means such that an internal message flow and a communication direction of the message information communicated from the originating information to the destination information is graphically displayed. What is achieved on the basis of these method steps is that specific, coded terms of the registered code words are converted into mnemonic information and displayed, whereby the mnemonic information are more comprehensible and, consequently, significantly simpler and faster to interpret. One advantage of the method of the present invention is that the logged information flow between the programs and, additionally, within the programs is illustrated by the graphic display of the directional information and, thus, is immediately recognizable. As a result thereof, the evaluation or interpretation time of such visualized, logged information is considerably shortened.

According to an advantageous development of the method of the present invention, a numerical subscriber line information representing subscriber lines of the communication system can be prescribed in addition to the originating and destination information. What is thereby achieved is that the logged information or code words for subscriber-line-related or port-related information is additionally selected in addition to the selection-criteria originating and destination information. On the basis of this measure, the logged message flow for individual subscriber lines or ports or a plurality of subscriber lines or ports can be visualized or displayed by mnemonic information.

A simplification of the interpretation is additionally achieved according to a further, advantageous development of the method of the present invention in that respectively identical originating or destination information, as well as the allocated status and message information are controlled at the display means such that these are displayed column-by-column. In the column-by-column display, the directional information is graphically displayed between the columns, as a result whereof a further structuring of the logged information that simplifies interpretation is effected.

The method of the present invention can be especially advantageously realized by a program-controlled input routine, selection routine and output routine. These routines are monitored and controlled or, respectively, initialized by a program-controlled main routine. As a result of this structuring, the input, the selection and the output of the code words is implemented largely independently of one another.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 depicts the software structure of a program that realizes the method of the present invention;

FIG. 2 depicts the method of the present invention with reference to a flow chart; and FIG. 3 depicts information logged during a call set up, converted according to the method of the present invention and visualized at a display means.

DESCRIPTION OF THE PREFERRED EMBODIMENT

FIG. 1 shows the program structure of a program that realizes the method of the present invention. A main routine MR controls and monitors the program. An input and output data file wherein the code words or are to be respectively deposited is established with the assistance of this main routine MR and the check of the input parameters is also carried out. Further, the input originating and destination information (let it be assumed for the exemplary embodiment that subscriber line or port information are additionally specified), as well as the port information are entered by the main routine MR into a port memory means PSP provided for this purpose. With the assistance of the main routine MR, error messages corresponding to an error appearing in a sub-routine are formed with the assistance of the main routine MR and are forwarded to an error treatment routine FR.

The code words that represent the logged information and are stored, for example, on a floppy disk are conducted via a standard input interface SIN both to the main routine MR as well as to an input routine ER. With the assistance of the input routine ER, the code words deposited in the input data file are read code word by code word and are deposited in an input memory ES. The incoming information is thereby checked with the assistance of a code word pattern for the purpose of a first code word recognition.

The code words deposited in the input memory ES, for example, in the ASCII code, are recoded with the assistance of the input routine ER, for example, hex code, and are forwarded to waiting line routine WR. This waiting line routine WR is administered by the respectively present operating system of a personal computer or of a communication system.

The main routine MR is also in communication with a selection routine SR. With the assistance of this selection routine SR, those code words whose port information, as well as originating or destination information coincide with the originating, destination and port information deposited in the parameter memory PSP are selected from the waiting line formed in the waiting line routine WR. In addition, insofar as input at the appertaining input means, code words can be selected whose originating or destination and port information is not deposited in the parameter memory but whose originating or destination and port information have been defined together with destination or originating and port information deposited in the parameter memory PSP in code words already selected. For example, the selecting for five different ports can be respectively implemented for two different programs.

The selected code words are subsequently processed with the assistance of an output routine AR. Specific terms of the code words, for example the terms: originating, destination and port information as well as the message and status information, are thereby converted into mnemonic, more user-comprehensible information. This conversion is implemented with the assistance of a mnemonic table MT. When prescribed, coded terms thereby appear, the allocated memory locations of the mnemonic table MT are read and are communicated via an output interface AST to a display means (not shown), for example a video screen means of an operating means, for the purpose of a visualization of the converted information.

FIG. 2 shows an essentially self-explanatory flow chart of the method of the present invention. The chronological sequences of the executions of the main, input, selection and output routines MR, ER, SR, AR explained in FIG. 1 are shown with reference to this flow chart.

FIG. 3 shows the logged information converted according to the method of the present invention by way of example, these being displayed at a display means of a personal computer or at an operating means of a communication system for a call set up from a subscriber line or port 48 to a subscriber line or port 2. In FIG. 3, the subscriber lines 48 and 2 are indicated by the port information pi port 48 and port 2. Let it also be assumed for the exemplary embodiment that the logged message flow between the terminal equipment program and a switching program is to be converted and displayed with the assistance of the method of the invention. The terminal equipment and switching program is shown in FIG. 3 on the basis of the mnemonic information EP, VP. Further, only the messages arriving at the terminal equipment or switching program are shown in FIG. 3. Every communication of a message is thereby illustrated with a time information zin, a status information zsn, a message information mn and a direction information rn. Both a message flow between the program modules EP, VP as well as in a program EP, VP can be displayed on the basis of the direction information rn. The time information zin is recited in milliseconds proceeding from the beginning of registration. The following meanings are assigned to the mnemonic information recited in FIG. 3:

c: switching program
onhook: quiescent condition (handset not lifted up)
offhook: active condition (subscriber has picked up the handset)
dial: dial status
wait: waiting status
silent: quiescent condition (with reference to a trunk)
setup: call set up request message
digit: selection digit
dig10: message that up to 10 selection digits are received
interpr: message to the internal selection evaluation means
seiz: seizure
seiza: seizure acknowledgement
end: end of selection
alert: message that ringing signals are communicated to the called subscriber
conn: message that the called subscriber has picked up the handset and was capable of being connected through.

On the basis of this mnemonic information and the graphic display of the directional information rn, the coded information logged by a trace program can be simply interpreted in a time-saving manner.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for visualizing switching-oriented, logged information about execution of switching-oriented programs utilized in a communication system, the logged information being formed by means of an administration and maintenance trace program module by logged code words that respectively log a program step, comprising the steps of:

selecting code words that are formed on a basis of program steps sequencing in prescribed originating programs and prescribed destination programs from the logged code words;
converting prescribed, coded terms of a selected code word into one of a mnemonic destination or originating information that represents a respective originating or destination program;
a mnemonic status information representing a switching-oriented status of the originating and/or destination program, and
a mnemonic message information representing a switching-oriented message;
forming a directional information indicating message flow by evaluating the originating and destination information in a selected code word; and
communicating the destination and originating information as well as the message, status and directional information and non-converted term information to a display means, the directional information being controlled at the display means such that at least one of internal message information and a communication direction of the message information communicated from the originating information to the destination information is graphically displayed.

2. The method according to claim 1, wherein code words whose logged, non-prescribed originating or destination information were logged together with prescribed destination or originating information in the selected code words are additionally selected.

3. The method according to claim 1, wherein numerical subscriber line information that represents subscriber lines of the communication system is prescribed in addition to the originating or destination information.

4. The method according to claim 3, wherein respectively identical originating or destination information as well as allocated status, message and subscriber line information are controlled at the display means such that the information is displayed column-by-column.

5. The method according to claim 1, wherein a program-controlled input routine, a program-controlled selection routine and a program-controlled output routine are controlled and monitored by means of a program-controlled main routine; wherein the code words are cyclically read into an input memory and checked as well as recorded by an input routine and are inserted into a waiting line controlled by a waiting line routine; wherein the code words are selected from the waiting line with prescribed originating and/or destination information by the selection routine; and wherein prescribed terms of the selected code words converted into mnemonic information and into directional information by the output routine are controlled at a display means.

6. A method for visualizing switching-oriented, logged information about execution of switching-oriented programs utilized in a communication system, the logged information being formed by means of an administration and maintenance trace program module by logged code words that respectively log a program step, comprising the steps of:

selecting code words that are formed on a basis of program steps sequencing in prescribed originating programs and prescribed destination programs from the logged code words;
converting prescribed, coded terms of a selected code word into at least one of a mnemonic destination or originating information that represents a respective originating or destination program;

numerical subscriber line information representing subscriber lines of the communication system;

a mnemonic status information representing a switching-oriented status of the originating and/or destination program, and a mnemonic message information representing a switching-oriented message;

forming a directional information indicating message flow by evaluating the originating and destination information in a selected code word; and communicating the destination and originating information as well as the message, subscriber line, status and directional information and non-converted term information to a display means, the directional information being controlled at the display means such that at least one of internal message information and communication direction of the message information communicated from the originating information to the destination information is graphically displayed.

7. The method according to claim 6, wherein code words whose logged, non-prescribed originating or destination information were logged together with prescribed destination or originating information in the selected code words are additionally selected.

8. The method according to claim 6, wherein respectively identical originating or destination information as well as allocated status, message and subscriber line information are controlled at the display means such that the information is displayed column-by-column.

9. The method according to claim 6, wherein a program-controlled input routine, a program-controlled selection routine and a program-controlled output routine are controlled and monitored by means of a program-controlled main routine; wherein the code words are cyclically read into an input memory and checked as well as recorded by an input routine and are inserted into a waiting line controlled by a waiting line routine; wherein the code words are selected from the waiting line with prescribed originating and/or destination information by the selection routine; and wherein prescribed terms of the selected code words converted into mnemonic information and into directional information by the output routine are controlled at a display means.

10. A method for visualizing switching-oriented, logged information about execution of switching-oriented programs utilized in a communication system, the logged information being formed by means of an administration and maintenance trace program module by logged code words that respectively log a program step, comprising the steps of:

controlling and monitoring a program-controlled input routine, a program-controlled selection routine and a program-controlled output routine by means of a program-controlled main routine;

selecting code words that are formed on a basis of program steps sequencing in prescribed originating programs and prescribed destination programs from the logged code words, the code words being cyclically read into an input memory and checked as well as recorded by the input routine and inserted into a waiting line controlled by a waiting line routine, and the code words being selected from the waiting line with the prescribed originating and/or destination information by the selection routine;

converting prescribed, coded terms of a selected code word into at least one of a mnemonic destination or originating information that represents a respective originating or destination program by the output routine;

numerical subscriber line information representing subscriber lines of the communication system;

a mnemonic status information representing a switching-oriented status of the originating and/or destination program, and a mnemonic message information representing a switching-oriented message;

forming a directional information indicating message flow by evaluating the originating and destination information in a selected code word; and communicating the destination and originating information as well as the message, subscriber line, status and directional information and non-converted term information to a display means, the directional information being controlled at the display means such that at least one of internal message information and communication direction of the message information communicated from the originating information to the destination information is graphically displayed.

11. The method according to claim 10, wherein code words whose logged, non-prescribed originating or destination information were logged together with prescribed destination or originating information in the selected code words are additionally selected.

12. The method according to claim 10, wherein respectively identical originating or destination information as well as allocated status, message and subscriber line information are controlled at the display means such that the information is displayed column-by-column.

* * * * *